Patented Oct. 19, 1943

2,332,220

UNITED STATES PATENT OFFICE 2,332,220

MICA PRODUCT AND METHOD OF PRODUCING THE SAME

Norman P. Harshberger, Scarsdale, N. Y., assignor, by mesne assignments, to Carbide and Carbon Chemicals Corporation, New York, N. Y., a corporation of New York No Drawing. Application November 3, 1939, Serial No. 302,671

5 Claims. (Cl. 117—100)

This invention relates to a new coloring material, to the use of such material in the production of decorative coatings upon building materials, and to the method of making such material. The invention particularly relates to a treated micaceous flake as a surfacing for bitumen coated roofing materials.

It has been common practice in the roofing art to utilize small plates or flakes of micaceous materials, particularly of a kind sometimes referred to as white mica, as a parting substance to prevent adhesion between adjacent layers of the usual mineral surfaced, asphalt saturated, and coated composition roofing. The flakes or plates are usually obtained by crushing large sections or splittings of mica or mica rock. Each flake usually comprises a laminated structure of many membraneous layers, has an irregular shape and has edges of irregular fracture, making the laminated structure visually discernible. The flakes come in various thicknesses, and in the majority, the laminations have been somewhat separated or expanded by the action of nature so that minute crevices or multiple voids have been created, in which moisture readily penetrates and accumulates. White mica flakes, in fact, nearly all raw mica flakes, are wholly transparent or translucent. They are therefore a medium for passage of light.

Mica flakes have seldom, except in the case of roll roofing, been utilized as an exposed surfacing for roofing but have been generally applied to the under surface of the roofing material, that is, the surface of the roofing material which is not exposed when the material is applied to a building structure. The reasons for this are perhaps found in the fact that mica flakes, because of their transparent and translucent properties, act as so many lenses when applied as a surfacing, and permit light rays destructive to bitumen, to pass through them and act on the underlying bitumen or other adhesive coating. This condition, in the case of bitumen, hastens its deterioration, by accelerating polymerization, loss of volatiles, and shrinkage, with subsequent dislodgment of the mica flakes. Moreover, the edge structures of some mica pieces are exposed to action of the elements, and moisture becomes entrapped in the crevices or voids thereof, causing delamination upon its expansion in freezing weather.

It is an object of my invention to provide a more durable micaceous surfacing for building materials, particularly composition roofing, that will, to a large extent, avoid the objections heretofore encountered in the use of such materials.

A further object is the provision of a mica flake or plate, the edges of whose laminated structure are substantially sealed from moisture.

Another object of the invention is the provision of a mica flake or plate whose surface has been treated with a coating material of opaque qualities, sufficient to render the mica piece substantially impervious to the transmission of light rays destructive to bitumen.

A further object of the invention is to provide, with a coating of transparent or light transmitting character, mica flakes or plates of light impervious properties or rendered so by heat treatment or calcining, the said coating being capable of sealing the edge voids of the flakes and being sufficiently light transmitting to show through the coating the natural coloration of the mica.

Another object of the invention is to provide mica flakes of light transmitting character with a surfacing of overlapping flake material, for instance, light reflective metal flakes substantially impervious to light and capable of dissipating surface heat.

A particular object is to provide mica flakes with a coating of thermoplastic material of water-insoluble character, adapted to substantially seal the edge voids of the mica structure, and with a further surfacing of overlapping metallic flakes as protection for the coating.

Another object of the invention is to provide mica flakes or plates with a waterproof coating capable of sealing the open edge structure of the mica pieces but without filling the voids, to obtain a light weight structure of entrapped air cells, providing high insulation value and durability in exposure.

Another object of the invention is to provide novel processes of treating mica flakes with coating materials and/or metallic flakes to make such mica flakes of more durable character.

Another object of the inveniton is to provide a durable surfacing for composition roofing having covering power superior to that of conventional roofing granules and capable of being anchored to bitumen or other coatings of much less thickness than required for granules and without puncturing the coating or the underlying base material.

Another object is to provide mica flakes with a surfacing that will improve the leafing properties of the mica when applied as a surfacing.

According to my invention, mica pieces reduced to a satisfactory workable size generally between 20 to 250 mesh, and preferably of a hard and durable physical character, are mixed with a suitable coating material adapted to provide a continuous adherent layer over each mica piece and to seal the edge structure thereof, and the coating is permitted to dry and/or harden. Preferably, the coating material is a finely divided solid substance having the characteristic of becoming fluid and adhesive upon heating to temperatures sufficient to melt them and which flow on and over the laminated mica structure to provide a substantially water impervious protective layer. It has been found that a layer formed in this manner substantially seals the voids or crevices of the laminated mica structure but does not fill them, so that the finished mica product contains entrapped air cells improving the insulation properties of the mica. Mica pieces coated in the stated manner do not sink when stirred or submerged in water, but rise and float. This is in distinct contrast to the raw mica pieces which readily sink in water.

The coating materials may comprise, for instance, substantially water-insoluble nautral or synthetic resins such as rosin or other resinous pine products, copal resins, coumarone and indene resins, and vinyl resins of low melting point, which give good binding characteristics, form transparent or translucent films over the mica pieces, and are resistant to bleeding or discoloration by bituminous materials with which they come in contact. Rosin is particularly adaptable because of its melting point akin to the high melting point asphalt coating common to roofing and to its rapid melting properties, its low specific gravity, its ease of handling with the mica flakes without recrushing after the mica is coated, and its low cost. Thermoplastic resins, such as vinyl resins and acid phenol aldehyde resins such as the so-called Novolaks, i. e., acid catalyzed resins in which phenol is usually reacted with less than an equimolecular quantity of formaldehyde in the presence of an acid (either organic or inorganic) catalyst, are also desirable because of their ability to fuse to hot bitumen or other coating, and phenol aldehyde resins of the thermo setting type may also be used, the melting point thereof being selected for the particular character of coating it is desired to obtain and with regard to whether or not additional surfacings or aggregates are to be included with such coating materials. Where, as will hereinafter be further pointed out, metallic surfacings are to be included, the melting point is preferably sufficiently low to avoid discoloration of the metallic surfacing.

The coating materials may be in the form of liquid compositions including a solvent, for instance, mineral spirits, benzene, alcohol, toluol, benzol; a suitable solvent being selected for the character of coating material to be used. However, liquid compositions of the coating material have not been found to give a void-sealing effect that is equal to that obtained with the melted dry materials as determined by the float test described above.

Where I utilize a solid coating material, the mica coating material may be heated together to cause flow of the coating material and the mixture is stirred sufficiently long to effectively coat each mica piece, the heat being then removed or reduced and the stirring continued until the mass has cooled. In the case of many materials, for instance, rosin, a very crumbly mass will be obtained so that the individual coated pieces readily separate. With phenolic resins, it is preferred to permit the mass to cool as a whole and to recrush. When a liquid coating composition is utilized, the mica pieces may be added to the solution and tumbled or stirred until the particles become coated, the excess of coating material being then drained off and the coating permitted to dry and/or harden. Preferably, the coated pieces are tumbled and kept in motion until the coating has sufficiently set or dried, and in order to keep the pieces in such a condition that they may be separated without crushing. With mica pieces of a light transmitting character, it is preferred that the coating materials be themselves opaque or have included therewith pigments of suitable character adapted to provide a coating substantially impervious to light. Where the mica particles are themselves substantially light resistant, such as raw mica of greenish, amber or black cast, or where the mica pieces are those containing iron in the ferrous state of oxidization, in amount preferably more than 1% and which have been heated or calcined at about 750° C. for about one and a half hours in the presence of air or other oxidizing atmosphere to convert the iron to the ferric state of oxidization to produce a rich, opaque golden to bronze color or sheen, the coating materials are preferably of a light transmitting character to enable the natural color of the mica to be expressed through the coating.

I have discovered that a particularly pleasing and ornamental mica particle may be obtained and its weathering properties made more durable and efficient where the mica has been treated with a continuous surfacing of overlapping metallic material such as metallic flakes, also referred to as bronzing powders, which may be aluminum flakes, copper flakes, bronze flakes, etc., aluminum flakes being preferred because of their ability to retain their light reflective surface characteristics after slight oxidization, as well as their extremely light weight. The coating of the mica pieces may be accomplished by including the metallic flakes as an aggregate with the coating materials heretofore set forth. It is preferred that the metallic particles be bonded to the mica by the coating materials which are utilized in a dry solid condition. For instance, a finely divided bonding material and mica may be heated together to cause fusion of the binder to the mica, the mass being stirred and cooled and crumbled or crushed, as the case may be. To this, the metallic material may be added and the mass slightly reheated to cause anchoring of the metallic pieces to the coating on the mica pieces. It will, of course, be understood that the binder in this case must be one capable of becoming plastic and adhesive upon reheating. A particular advantage of this method is the retention by the metallic material of its natural lustre. Another method of coating the mica particles is to heat all three materials together and stir sufficiently to coat the mica pieces and continue stirring to form a crumbly mass that separates on removal of the heat, or to continue agitation until the bonding agent has set or hardened, or, in the case of certain binding agents, to permit the mass to set and subsequently crush to proper size pieces. Another method found expedient in many cases with particular binding agents, is to mix the finely divided binder and metallic material together cold, and to add this composition to the mica pieces that have been previously heated by a separate operation to a temperature below that causing discoloration and from which the heat has been removed, and to stir the mass whereby the hot mica produces flow of the binder. By this method, no reheating should be necessary.

In order that those skilled in the art may have some indication of the possibilities of this invention, I am providing the following examples of structures made in accordance with my invention and which are representative of satisfactory practice for general purposes of the materials there indicated. It will be understood that similar processing may be applied to other materials than those called for and that with a small amount of experience those skilled in the art will be able to apply the principles of the invention without difficulty.

*Example No. 1*

Mix together 90 grams of flake mica, for instance, mica schist, 10 grams of powdered rosin and 1 gram of aluminum flakes of about 250 to 325 mesh. Heat the mass and stir until all the rosin has melted and a crumbly mass is formed that readily separates on removing the heat. It will be found that the pieces of mica have been uniformly coated with the rosin and have an exposed surface of aluminum flakes rendering them substantially impervious to light. By the float test, it will also be found that the edges of the mica are sealed.

*Example No. 2*

Mix together 45 grams of white mica of about 40 mesh with 10 grams of rosin and heat together until the rosin has melted and fused to the mica. Stir the mass while heating until all the rosin has melted and remove the heat. The mass will be found to readily crumble upon cooling. Now add to the rosin coated mica, one gram of aluminum bronzing powder and slightly reheat, the amount of heat being sufficient to render the rosin plastic and adhesive, yet insufficient to destroy the lustre of the aluminum. Stir the mass until the rosin coated mica pieces are provided with a continuous surfacing of overlapping aluminum flakes.

*Example No. 3*

Using the same proportions of materials as in Example No. 1, heat the mica and rosin as per Example No. 2 and add the aluminum flakes as there indicated.

*Example No. 4*

Using the proportions and materials of Example No. 1, mix the rosin and aluminum powder together. Heat the mica separately to a temperature below that causing discoloration of the mica. Remove the mica from the heat, promptly add the rosin-aluminum mixture and stir. The mica will be found to retain sufficient heat to cause fusion of the rosin and aluminum to the mica. By this method of processing, no reheating is necessary.

*Example No. 5*

Mix together and heat 45 grams of mica pieces of about 250 mesh size and 10 grams of rosin finely ground to a size in the order of 150 to 250 mesh and stir. Continue the heat until all the rosin has melted and becomes bonded to the mica. This forms a crumbly non-tacky mass readily separated into individual mica pieces upon cooling. Now, add one gram of aluminum bronzing powder and slightly heat the mass while stirring, to cause fusion of the aluminum particles to the rosin coated mica pieces. It will be found that the aluminum powder, by this method of processing, is densely concentrated at the surface of the mica pieces and a very brilliant surface effect is produced.

*Example No. 6*

Heat together and stir 45 grams of mica pieces of about 250 mesh size with 10 grams of finely ground rosin. Continue stirring and allow to cool after all the rosin has melted. Then add 5.5 grams of a chromium oxide pigment and reheat the mass and stir. This will make a green colored mica particle which is resistant to light transmission and suitable as an ornamental surfacing for many applications, for instance, shingles, or which may be applied to cement blocks preferably while the cement is plastic. Where applied to base material such a cement blocks, that may be slightly heated, the effect of heating is to cause fusion of the rosin particles together to form a weather resistant barrier, and also to make the anchorage of the mica more secure.

*Example No. 7*

Mix together 90 grams of coarse mica and 10 grams of powdered rosin, and heat, while stirring, to cause melting of the rosin. While the mixture is still hot, add one gram of aluminum bronzing powder to the mass, continue stirring, and then cool.

*Example No. 8*

Mix together and prepare in accordance with the steps of Example No. 5, 45 grams of 250 mesh mica, 10 grams of pulverized rosin, and one gram of aluminum bronzing powder and apply the coated pieces to a moving, hot bitumen coated web. In order to permit any excess material to fall free into a recovery receptacle, it is preferred, in such application, that the web pass around a roller, approaching and leaving it in a substantially horizontal plane, and that the coated mica be applied at a point above the horizontal center line of the roller and just inside a tangent to the outermost point of warp of the web. If the coated pieces were applied in excess to the horizontally moving face of the hot web, the fusion of the rosin would be so rapid that none of the excess of coated mica pieces could be recovered.

It will be understood that in the foregoing examples other bronzing powders, for instance, bronze flakes or copper flakes, may be substituted for the aluminum flakes and a useful coated mica piece obtained; also, that other binding agents may be substituted for the rosin. Of course, certain binders will require more or less heat than rosin to obtain good results, and in certain instances will require pulverizing of the mass where it is of a more solid character as a result of the treatment. Also, it will be understood that the resultant coated products may have different weathering and bonding characteristics than those in the example. Where the binder is of a thermo-setting type, the processing may be carried part way to produce the coated material, and the coated particles may be subsequently reheated to the temperatures sufficient to obtain complete polymerization of the binder.

From the foregoing description of my invention, it will be seen that I have provided a novel coloring material utilizing mica pieces as a base that is capable of withstanding exposure to the weather, has considerable insulation value, and provides a durable ornamental surface. I have also disclosed many novel processes of producing such coloring material. It is to be understood that while the structures and methods herein described constitute preferred and/or exemplified embodiments of the invention, the invention is not to be limited thereto for it will be evident to those skilled in the art that numerous changes and modifications may be made in the details involved without departing from the scope and spirit of my invention, which is to be construed as broadly as the following claims taken in conjunction with the prior art may allow.

I claim:

1. The process of producing individual mica flakes coated on all surfaces comprising mixing individual mica flakes the flake size of which is between 20 to 250 mesh, and a particulate resinous binder of fusible character, heating the mixture to produce fusion of the resinous binder and coating of all surfaces of the mica flakes with resin, and surfacing the resin coated mica flakes with bronzing powder while the resinous coating is still sufficiently heated to be plastic.

2. The process of producing individual mica flakes coated on all surfaces comprising mixing mica flakes the size of which is between 20 to 250 mesh, with a particulate resinous binder of fusible character, heating the mixture to produce fusion of the resinous binder and coating of all surfaces of the mica flakes with resin, cooling the mass, adding metallic flakes the size of which is smaller than 250 mesh, reheating the mass sufficiently to render the resinous coatings adhesive but not to an extent to destroy the natural lustre of the metallic flakes, and agitating the mixture to produce adherence of the metallic flakes to the resinous coating enveloping the individual mica flakes.

3. The process of treating individual mica flakes comprising mixing a finely divided fusible resinous binder and a particulate metal the particulate size of which is smaller than 250 mesh, heating individual mica flakes the size of which is between 20 to 250 mesh, to a temperature below that causing perceptive discoloration of the mica flakes, combining the mixture of metal and resinous binder with the individual hot mica flakes and agitating, said individual mica flakes retaining sufficient heat to produce flow of the resinous binder and coating of all surfaces of the individual mica flakes with resin and metal.

4. As an article of manufacture, a coated building element comprising an individual mica flake core the size of which is between 20 to 250 mesh, and a substantially continuous coating bonded to all exterior surfaces of said mica flake core and comprising fused resin and overlapping metallic flakes the size of which is smaller than 250 mesh.

5. As an article of manufacture, a coated building element consisting of an individual mica flake the size of which is between 20 to 250 mesh, said mica flake being completely enveloped in a coating of fused rosin the entire outer surface of which is covered with overlapping aluminum flakes the size of which is smaller than 250 mesh.

NORMAN P. HARSHBERGER.

CERTIFICATE OF CORRECTION.

Patent No. 2,332,220.　　　　　　　　　　　　　　October 19, 1943.

NORMAN P. HARSHBERGER.

It is hereby certified that error appears in the printed specification of the above numbered patent requiring correction as follows: Page 2, first column, line 68, for "mica coating" read --mica and coating--; page 3, second column, line 46, Example 8, for "warp" read --wrap--; and that the said Letters Patent should be read with this correction therein that the same may conform to the record of the case in the Patent Office.

Signed and sealed this 11th day of January, A. D. 1944.

(Seal)　　　　　　　　　　　　　　　　　　　Henry Van Arsdale,
　　　　　　　　　　　　　　　　　　　Acting Commissioner of Patents.